US009848301B2

(12) United States Patent
Mappus et al.

(10) Patent No.: US 9,848,301 B2
(45) Date of Patent: Dec. 19, 2017

(54) FACILITATION OF MOBILE DEVICE GEOLOCATION

(71) Applicants: AT&T Intellectual Property I, L.P., Atlanta, GA (US); AT&T Mobility II LLC, Atlanta, GA (US)

(72) Inventors: Rudolph Mappus, Plano, TX (US); Jeremy Fix, Acworth, GA (US); Ravishankar Doejode, Johns Creek, GA (US); James Morgan White, Dallas, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 88 days.

(21) Appl. No.: 14/947,152

(22) Filed: Nov. 20, 2015

(65) Prior Publication Data

US 2017/0150318 A1    May 25, 2017

(51) Int. Cl.
*H04W 4/02*    (2009.01)

(52) U.S. Cl.
CPC .................... *H04W 4/025* (2013.01)

(58) Field of Classification Search
CPC .................................................. H04W 4/025
USPC ...................................................... 455/456.1
See application file for complete search history.

(56) References Cited

U.S. PATENT DOCUMENTS

| 6,674,403 B2 | 1/2004 | Gray et al. |
| 6,973,319 B2 | 12/2005 | Ormson |
| 6,975,939 B2 | 12/2005 | Edwards et al. |
| 7,026,983 B2 | 4/2006 | Spratt |
| 7,132,981 B1 | 11/2006 | Roberts |
| 7,158,078 B2 | 1/2007 | Ninomiya et al. |
| 7,250,907 B2 | 7/2007 | Krumm et al. |
| 7,606,580 B2 | 10/2009 | Granito et al. |
| 7,746,225 B1 * | 6/2010 | Arnoult, Jr. ........... G01S 3/8086 340/539.13 |

(Continued)

FOREIGN PATENT DOCUMENTS

| CN | 101449598 A | 6/2009 |
| WO | 2004036934 A1 | 4/2004 |

(Continued)

OTHER PUBLICATIONS

Lachance-Bernard et al., "Network based Kernel Density Estimation for Cycling Facilities Optimal Location Applied to Ljubljana", Computational Science and Its Applications-ICCSA, 2011, Springer Berlin Heidelberg, pp. 136-150, 16 pages. Retrieved on Sep. 10, 2015. http://www.researchgate.net/profile/Matej_Niksic/publication/221434125_Network_based_Kernal_Density_Estimation_for_Cycling_Facilities_Optimal_Location_Appiled_to_Ljubljana/links/54b796920cf2e68eb2802b50.pdf.

(Continued)

*Primary Examiner* — Qun Shen
(74) *Attorney, Agent, or Firm* — Amin, Turocy & Watson, LLP

(57) ABSTRACT

More efficient mobile device location data can be obtained by estimating a most likely location point in a coverage pattern using a kernel density estimation technique. The kernel density estimation technique can provide a continuous estimate of the most frequented locations of a mobile device(s) within a coverage area. For each wireless sector, the collected location data can grouped to the closest geographic coordinate system, and an inference can be made based on the grouped data.

20 Claims, 12 Drawing Sheets

(56) References Cited

U.S. PATENT DOCUMENTS

| | | |
|---|---|---|
| 7,764,231 B1 | 7/2010 | Karr et al. |
| 7,818,016 B2* | 10/2010 | Ahn .................. G08B 27/006 |
| | | 455/404.2 |
| 7,885,248 B2 | 2/2011 | Harper et al. |
| 8,000,726 B2 | 8/2011 | Altman et al. |
| 8,019,352 B2 | 9/2011 | Rappaport et al. |
| 8,369,266 B2 | 2/2013 | Jin et al. |
| 8,406,783 B2 | 3/2013 | Eitan et al. |
| 8,412,234 B1 | 4/2013 | Gatmir-motahari et al. |
| 8,457,880 B1 | 6/2013 | Malalur et al. |
| 8,564,596 B2 | 10/2013 | Carrino et al. |
| 8,798,639 B2 | 8/2014 | Wachter et al. |
| 8,804,551 B2 | 8/2014 | Marshall et al. |
| 8,825,080 B1 | 9/2014 | Lookingbill et al. |
| 8,838,376 B2 | 9/2014 | Garin et al. |
| 8,849,308 B2 | 9/2014 | Marti et al. |
| 8,898,002 B2 | 11/2014 | Barrett et al. |
| 8,942,725 B2 | 1/2015 | Marti et al. |
| 9,002,612 B2 | 4/2015 | McNew |
| 9,049,549 B2 | 6/2015 | Chang et al. |
| 9,071,937 B2 | 6/2015 | Marti et al. |
| 9,076,165 B2 | 7/2015 | Busch |
| 9,113,293 B1 | 8/2015 | Rayburn et al. |
| 9,121,933 B2 | 9/2015 | Frankenberger et al. |
| 9,125,019 B1 | 9/2015 | Heikkila et al. |
| 9,217,788 B2 | 12/2015 | Klepal et al. |
| 2007/0161383 A1 | 7/2007 | Caci |
| 2008/0007397 A1* | 1/2008 | Glazer .................. G08B 21/0227 |
| | | 340/539.11 |
| 2008/0188236 A1* | 8/2008 | Alles .................. G01S 5/021 |
| | | 455/456.1 |
| 2008/0234928 A1 | 9/2008 | Matsuoka |
| 2009/0075677 A1 | 3/2009 | Seger et al. |
| 2010/0151789 A1 | 6/2010 | Suzuki et al. |
| 2011/0170799 A1* | 7/2011 | Carrino .............. G06F 17/30241 |
| | | 382/285 |
| 2012/0317104 A1 | 12/2012 | Radlinski et al. |
| 2013/0060632 A1* | 3/2013 | Gadhia .................. H04L 67/18 |
| | | 705/14.53 |
| 2013/0212168 A1* | 8/2013 | Bonasera ............ G06F 19/3418 |
| | | 709/203 |
| 2013/0217418 A1 | 8/2013 | Maurin et al. |
| 2014/0171118 A1* | 6/2014 | Marti .................. G01S 5/0252 |
| | | 455/456.3 |
| 2014/0256323 A1 | 9/2014 | Edge et al. |
| 2014/0258201 A1 | 9/2014 | Finlow-Bates |
| 2014/0342696 A1 | 11/2014 | Cooper et al. |
| 2014/0364101 A1* | 12/2014 | Do .................. H04W 4/02 |
| | | 455/418 |
| 2015/0029176 A1* | 1/2015 | Baxter .................. G06T 15/00 |
| | | 345/419 |
| 2015/0050951 A1 | 2/2015 | Thornton |
| 2015/0100244 A1* | 4/2015 | Hannum .................. G06F 19/22 |
| | | 702/19 |
| 2015/0148058 A1 | 5/2015 | Eunice et al. |
| 2015/0287058 A1* | 10/2015 | Dance .................. G06Q 30/0202 |
| | | 705/7.35 |

FOREIGN PATENT DOCUMENTS

| | | |
|---|---|---|
| WO | 2010123655 A1 | 10/2010 |
| WO | 2013186552 A2 | 12/2013 |

OTHER PUBLICATIONS

Lichman et al,. "Modeling Human Location Data with Mixtures of Kernel Densities", Proceedings of the 20th ACM SIGKDD International Conference on Knowledge Discovery and Data Mining, 2014, ACM, 10 pages. Retrieved on Mar. 10, 2015. http://www.datalab.uci.edu/papers/kernel_KDD2014.pdf.

Peng et al., "Temporal Coverage Based Content Distribution in Heterogeneous Smart Device Networks", 2015, 6 pages. Retrieved on Sep. 10, 2015. http://cs.iupui.edu/~pengw/doc/pub/peng2015temporal.pdf.

Do et al., "A probabilistic kernel method for human mobility prediction with smartphones", Pervasive and Mobile Computing, Sep. 2014, 16 pages. Retrieved on Sep. 10, 2015. http://infoscience.epfl.ch/record/202568/files/Do_PMC_2014.pdf.

Wu et al., "Semantic Annotation of Mobility Data using Social Media, Proceedings of the 24th International Conference on World Wide Web", International World Wide Web Conferences Steering Committee, 2015, 11 pages. Retrieved on Sep. 10, 2015. http://dl.acm.org/citation.cfm?id=2741675.

Stopczynski et al., "Measuring Large-Scale Social Networks with High Resolution", PloS one 9.4, 2014, 24 pages. Retrieved on Sep. 10, 2015. http://dx.plos.org/10.1371/journal.pone.0095978.

Peddemors et al., "Predicting mobility events on personal devices", Pervasive and Mobile Computing 6.4, Aug. 2010, 28 pages. Retrieved on Feb. 19, 2016. https://www.researchgate.net/publication/220310410_Predicting_mobility_events_on_personal_devices/.

Smith, et al. "Tracking moving devices with the cricket location system." Proceedings of the 2nd international conference on Mobile systems, applications, and services. ACM, 2004. http://nms.csail.mit.edu/papers/tracking_mobisys04.pdf, 13 pages.

"Blumenstock, et al. ""Probabilistic inference of unknown locations: Exploiting collective behavior when individual data is scarce."" Proceedings of the Fifth ACM Symposium on Computing for Development. ACM, 2014, 9 pages.http://www.jblumenstock.com/files/papers/jblumenstock_dev2014.pdf".

Li, et al. "Inferring movement trajectories from gps snippets." Proceedings of the Eighth ACM International Conference on Web Search and Data Mining. ACM, 2015. https://www.cs.cmu.edu/~muli/file/geo.pdf, 10 pages.

"Kaushal, et al. ""Location-based services & positioning technique using SUPL (SecureUserPlaneocation)"",www.inttechservices.com,http://www.Inttechservices.com/media/31880/wp_locationbasedservicesandpositioningtechniqueusingsupl.pdf, May 2015, 11 pages."

Ferris, et al. "Gaussian processes for signal strength-based location estimation." In proc. of robotics science and systems. 2006. http://www.roboticsproceedings.org/rss02/p39.pdf, 8 pages.

* cited by examiner

FACILITATION OF MOBILE DEVICE GEOLOCATION

TECHNICAL FIELD

This disclosure relates generally to facilitating mobile device geolocation. More specifically, this disclosure relates to the use of a probability density function to determine a probable mobile device location.

BACKGROUND

Geolocation is the identification of the real-world geographic location of an object, such as a radar source, mobile phone or Internet-connected computer terminal. Geolocation can refer to the practice of assessing the location, or to the actual assessed location. Geolocation is closely related to the use of positioning systems but may be distinguished from it by a greater emphasis on determining a meaningful location (e.g. a street address) rather than just a set of geographic coordinates.

For either geolocating or positioning, the locating engine often uses radio frequency (RF) location methods, for example Time Difference Of Arrival (TDOA) for precision. TDOA systems often utilize mapping displays or other geographic information system. When a GPS signal is unavailable, geolocation applications can use information from cell towers to triangulate the approximate position, a method that is not as accurate as GPS but has greatly improved in recent years. This is in contrast to earlier radiolocation technologies.

The above-described background relating to geolocation is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
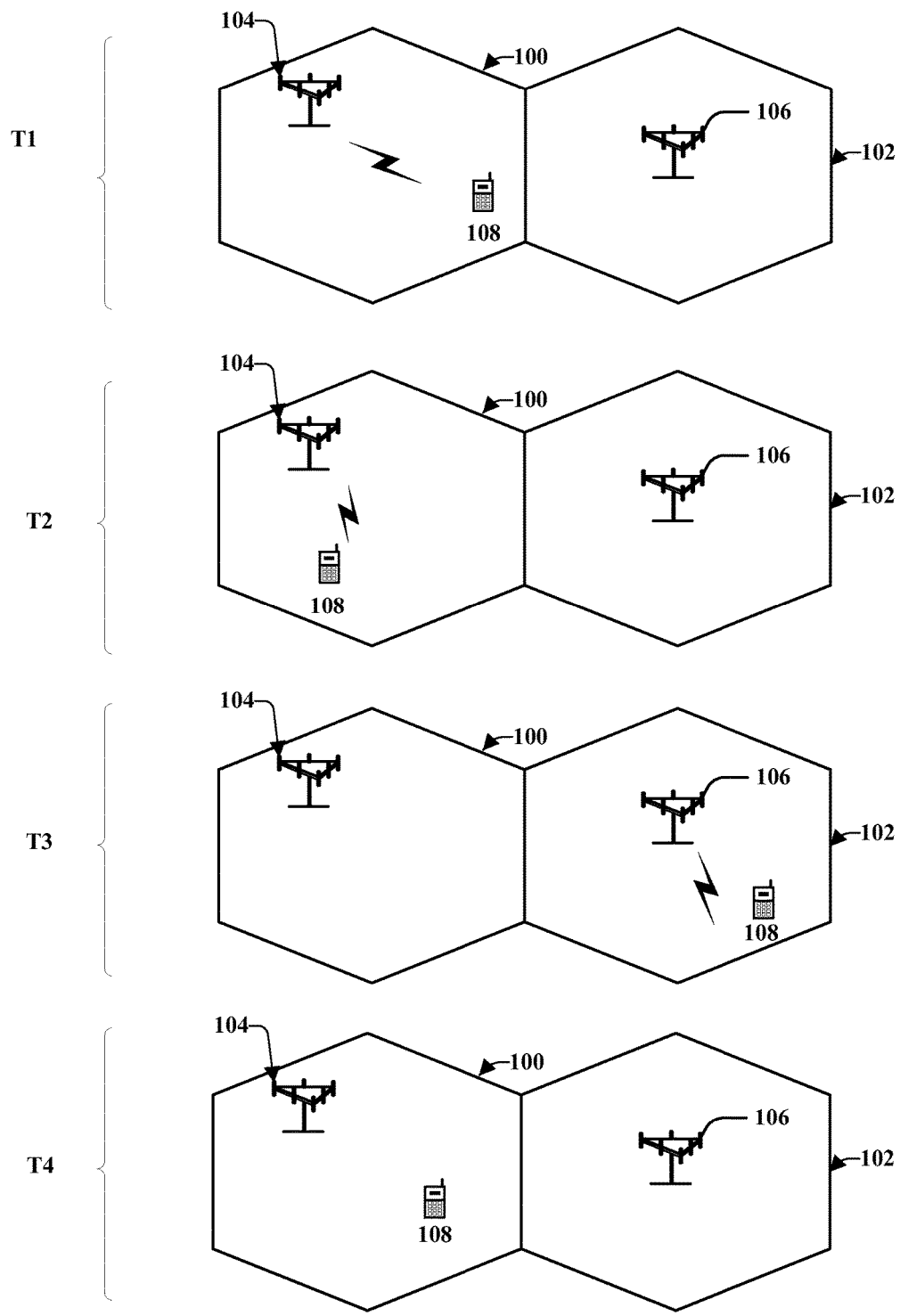
FIG. 1 illustrates an example wireless device at various points of time within a wireless network according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above-identified deficiencies and other drawbacks of traditional GPS, various embodiments are described herein to facilitate mobile device geolocation within a wireless network.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

Described herein are systems, methods, articles of manufacture, and other embodiments or implementations that can facilitate geolocation of mobile device. Facilitating geolocation can be implemented in connection with any type of device with a connection to the communications network such as: a mobile handset, a computer, a handheld device, or the like.

Providing location data for mobile devices in a wireless network, where accurate location data is not available can be difficult since mobile devices may be capable of regularly reporting location data to the wireless network. Leveraging location data of location-reporting mobile devices can provide location data for non-reporting devices. Identifying a most likely place in a cellular sector or wireless coverage pattern can be based on identifying the most frequented location in the network node's coverage pattern. Current estimation techniques can include using the coordinates of network hardware (e.g. a wireless hub or a transceiver). However, network hardware is typically fixed to a specific location, allowing for a fast, precise (i.e. repeatable) location estimate for devices in a coverage pattern. Using network hardware location to localize wireless devices is often not accurate, as devices can be up to several kilometers away from the transceiver in the case of cellular networks.

The most likely location point in a coverage pattern can be estimated using a kernel density estimation technique to provide a continuous estimate of the most frequented locations in the coverage area. For each wireless sector, the collected location data can be binned (grouped) to the closest geographic coordinate system. Data binning or bucketing is a data pre-processing technique used to reduce the effects of minor observation errors. The original data values, which fall in a given small interval, a bin, are replaced by a value representative of that interval, often the central value as a form of quantization. Quantization, in mathematics and digital signal processing, is the process of mapping a large set of input values to a (countable) smaller set. Rounding and truncation are typical examples of quantization processes. Quantization is involved to some degree in nearly all digital signal processing, as the process of representing a signal in digital form ordinarily involves rounding.

The geographic coordinate system, used for binning, can be a military grid reference system (MGRS). MGRS bins are a standard way of binning location (latitude and longitude) data with arbitrary precision. MGRS is the geocoordinate standard used by some militaries for locating points on the earth. The MGRS is derived from the universal transverse mercator (UTM) grid system and the universal polar stereographic (UPS) grid system, but uses a different labeling convention.

Kernel density estimation (or other estimation functions such as Gaussian estimators) can then be applied to the bin data arranged by their MGRS bin locations. Kernel density estimation can produce a smooth surface over the coverage area, and determine the most likely point in the coverage area based on the observed location data. For instance, the most frequented location can then be determined by finding the most likely point(s) on the kernel density surface. Once computed, the point(s) can be stored in a data structure indexed by a sector identifier, which can allow for efficient lookups to support both batch and real-time usage. The data structure can be updated at regular intervals (i.e.: weekly, daily, hourly, etc.), by using the historical and most recently collected location data.

Kernel density estimation is a non-parametric way to estimate the probability density function of a random variable. Kernel density estimation can be used for smoothing data where inferences about the population are made, based on a finite data sample. For example, let $(x_1, x_2, \ldots, x_n)$ be an independent and identically distributed sample drawn from some distribution with an unknown density $f$. Estimating the shape of this function $f$ can comprise:

$$\hat{f}_h(x) = \frac{1}{n}\sum_{i=1}^{n} K_h(x - x_i) = \frac{1}{nh}\sum_{i=1}^{n} K\left(\frac{x - x_i}{h}\right),\quad \text{Eqn (1)}$$

where $K(\cdot)$ is the kernel—a non-negative function that integrates to one and has mean zero—and $h>0$ is a smoothing parameter called the bandwidth. A kernel with subscript h is called the scaled kernel and defined as $K_h(x)=1/h\, K(x/h)$. Therefore, h can be chosen as small as the data will allow, however there can be a trade-off between the bias of the estimator and its variance.

A variety of kernel functions can be used: uniform, triangular, biweight, triweight, Epanechnikov, normal, etc. The Epanechnikov kernel is optimal in a mean square error sense, though the loss of efficiency is small for the kernels listed previously, and due to its convenient mathematical properties, the normal kernel is often used $K(x)=\phi(x)$, where $\phi$ is the standard normal density function. The construction of a kernel density estimate can find interpretations in fields outside of density estimation. For example, in thermodynamics, this can be equivalent to the amount of heat generated when heat kernels (the fundamental solution to the heat equation) are placed at each data point locations $x_i$. Similar methods can be used to construct discrete Laplace operators on point clouds for manifold learning.

Kernel density estimates are closely related to histograms, but can be endowed with properties such as smoothness or continuity by using a suitable kernel. For the kernel density estimate, a normal kernel with variance $x_j$ can be placed on each of the data points $x_i$. The kernels can be summed to make the kernel density estimate smoother, as compared to the discreteness of a histogram, as kernel density estimates converge faster to the true underlying density for continuous random variables.

Kernel density estimates can also be used in conjunction with GPS data. For instance, within a wireless network, GPS can be the default geolocation system used. However, should GPS data not readily be available at a specific time, the wireless network can resort to the kernel density estimation technique. Furthermore, real-time and previous GPS data can be used in conjunction with a kernel density estimation to provide additional and/or more robust data for accuracy.

Furthermore, leveraging kernel density estimate data can allow service providers to offer additional services or coupons. Generating detailed information on mobile device locations can suggest where additional network capacity may be needed. For example, if a volume of the mobile devices in a location exceeds a capacity of transceivers assigned to a coverage area, it could suggest that additional network capacity is needed within the coverage area. Conversely, if the volume of the mobile devices in the coverage area remains small and the network capacity never utilizes resources in the coverage area, the network capacity can be reallocated to other coverage areas.

Additionally, leveraging kernel density estimate data in conjunction with weather, traffic, news and/or retail location data can enable targeted opportunities. Location sensitive information can be used to provide services, which can inform customers of events in their immediate area. For example, leverage location and time data to predict that a number of mobile devices will be in a specific area at a specific time can allow retail stores to issues coupons to garner additional business.

To prevent misleading results from a small number of reporting mobile devices in a coverage area, location data can be provided after a threshold number of different mobile devices with a threshold number of samples (locates) has reported in a coverage area. Threshold values for the number of mobile devices to report and the number of samples can vary with the type of construction. For example, rural sites can consider a ratio of the number of samples over the number of reporting mobile devices while urban sites can prefer more mobile devices reporting than the number of samples per mobile device. Further, in Wi-Fi usage cases where sample rates can be higher, the number of mobile devices can be weighted higher.

In one embodiment, described herein is a method comprising receiving location data, grouping the location data according to a geographic coordinate system, and estimating a probability density of a random variable associated with the grouping. Thereafter, the method can identify a location point based on the probability density, and determine a probable location of the mobile device according to a defined probability function in response to the identifying.

According to another embodiment, a system can facilitate receiving mobile device location, binning the location data according to bins of a geographic coordinate system, and in response to determining a probable location of the mobile device, determining a frequented location of the mobile device, wherein the determining the probable location comprises estimating a probability density of a random variable associated with the binning.

According to yet another embodiment, described herein is a machine-readable storage medium that can perform the operations comprising receiving location data representing previous locations of mobile devices, grouping the location data according to areas of a geographic coordinate system, and estimating a probability density of a random variable associated with the groups. The machine-readable medium can then identify a location point based on the probability density, and based on the previous locations of the mobile device and the location point, determine a probable location of a mobile device of the mobile devices.

These and other embodiments or implementations are described in more detail below with reference to the drawings.

Referring now to FIG. 1, illustrated is an example wireless device at various points of time within a wireless network according to one or more embodiments. At time T1 the wireless network can comprise mobile device communication areas 100, 102. Mobile device 108 can communicate with base station 104 because the mobile device 108 is within the mobile device communication area 100. For the specific time T1, the mobile device 108 communication with the base station 104 can represent that the mobile device 108 is within the mobile device communication area 100. This information can be stored at a device within the wireless network.

At time T2 the wireless network can comprise mobile device communication areas 100, 102. Mobile device 108 can communicate with base station 104 because the mobile device 108 is still within the mobile device communication area 100. For the specific time T2, the mobile device 108 communication with the base station 104 can represent that the mobile device 108 is within the mobile device communication area 100. This information can be stored at a device within the wireless network.

At time T3 the wireless network can comprise mobile device communication areas 100, 102. Mobile device 108 can communicate with base station 106 because the mobile device 108 is still within the mobile device communication area 102. For the specific time T3, the mobile device 108 communication with the base station 106 can represent that the mobile device 108 is within the mobile device communication area 102. This information can be stored at a device within the wireless network.

Based on the aggregated information from times T1, T2, and T3, a kernel density estimator can be used to predict the probability that the mobile device 108 is within a specific communication area 100, 102. For instance, at time T4 if location data of the mobile device 108 is not readily available because the mobile device 108 is not providing position data, the kernel density estimator can be used to predict a location of the device 108 based on the stored data from times T1, T2, and T3. Thus, at time T4, a prediction can be made that the mobile device 108 is within the mobile device communication area 100 based on a kernel density estimation being applied to previously stored location data.

Figure 2:
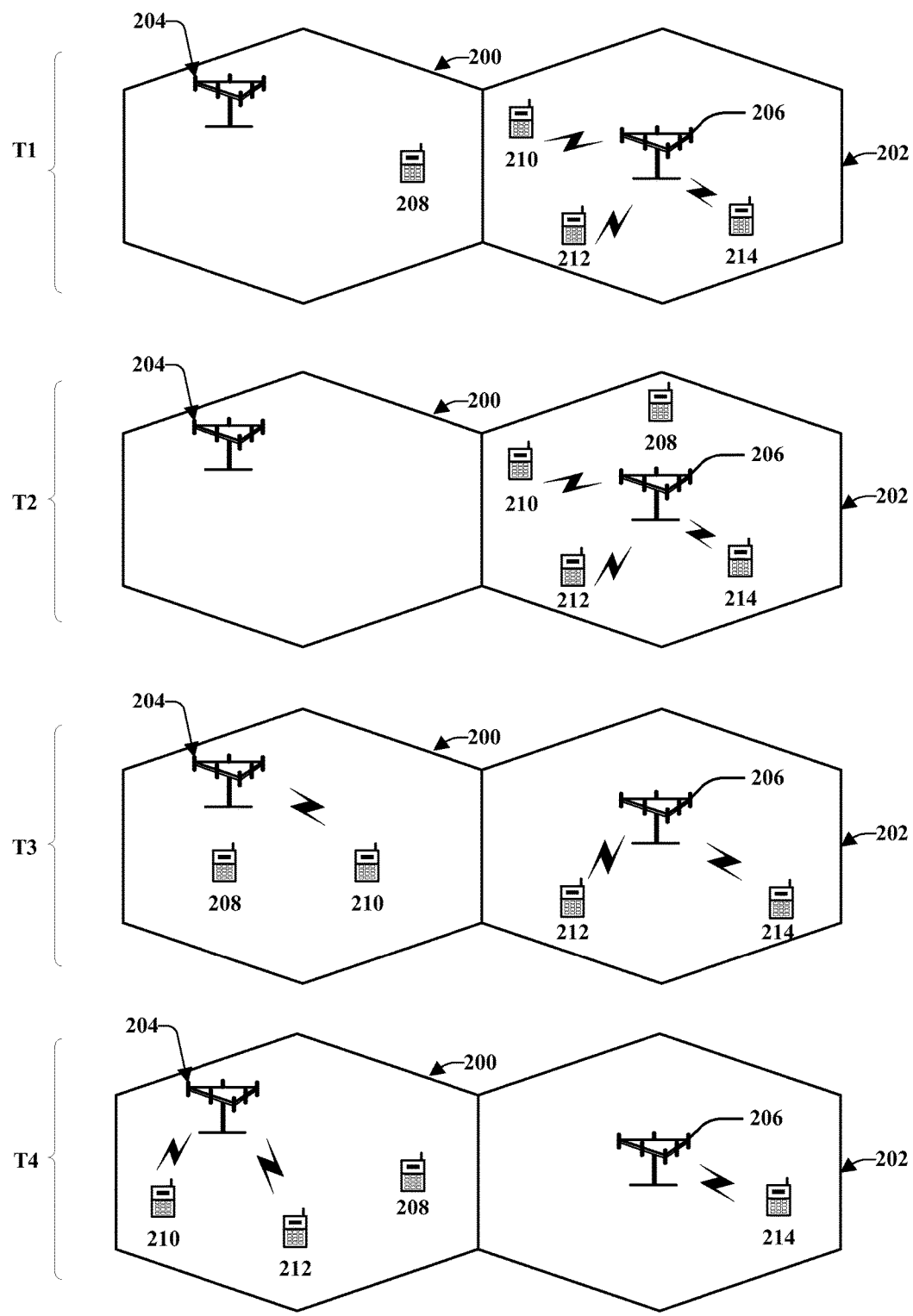
FIG. 2 illustrates example wireless devices at various points of time within a wireless network according to one or more embodiments.

Referring now to FIG. 2, illustrated is an example wireless devices at various points of time within a wireless network according to one or more embodiments. At time T1 the wireless network can comprise mobile device communication areas 200, 202. Mobile device 208 can be located within the mobile device communication area 200. Mobile devices 210, 212, 214 can communication with base station 206 because the mobile devices 210, 212, 214 are within the mobile device communication area 202. For the specific time T1, the mobile device 208 may not be communicating its location to the base station 204 even if the mobile device 208 is within the mobile device communication area 200. For the specific time T1, the mobile devices 210, 212, 214 communication with the base station 206 can represent that the mobile devices 210, 212, 214 are within the mobile device communication area 202. This information can be stored at a device within the wireless network.

At time T2 the wireless network can comprise mobile device communication areas 200, 202. Mobile devices 210, 212, 214 can communicate with base station 206 because the mobile devices 210, 212, 214 are within the mobile device communication area 202. However, for the specific time T2, the mobile device 208 may not be communicating its location to the base station 206 even if the mobile device 208 is within the mobile device communication area 202. This information can be stored at a device within the wireless network.

At time T3 the wireless network can comprise mobile device communication areas 200, 202. Mobile devices 212, 214 can communicate with base station 206 because the mobile devices 212, 214 are within the mobile device communication area 202. Mobile device 210 can communicate with the base station 204 because the mobile device 210 is within the mobile device communication area 200. However, for the time T3, the mobile device 208 may not be communicating its location to the base station 204 even if the mobile device 208 is within the mobile device communication area 200. This information can be stored at a device within the wireless network.

At time T4 the wireless network can comprise mobile device communication areas 200, 202. Mobile device 214 can communicate with base station 206 because the mobile device 214 is within the mobile device communication area 202. Mobile devices 210, 212 can communicate with the base station 204 because the mobile devices 210 212 are within the mobile device communication area 200. The mobile device 214 can communicate with base station 206 because it is within the mobile device communication area 202. However, the mobile device 208 may not be communicating its location to the base station 204 even if the mobile device 208 is within the mobile device communication area 200. This information can be stored at a device within the wireless network.

Based on the aggregated or non-aggregated information from times T1, T2, T3, and T4, a kernel density estimator can be used to predict the probability that the mobile device 208 is within a specific communication area 200, 202. At T1, since the mobile device 208 is not communicating its location data to any base station, the network can rely on aggregated location information from the mobile devices 210, 212, 214 to predict, using a kernel density estimator, that the mobile device is near the mobile device communication area 202 even though the mobile device 208 is within the mobile device communication area 200.

The kernel density estimator can also take into account the location data of other mobile devices 210, 212, 214 to predict the location of the mobile device 208. For example, at time T2, although the mobile device 208 is not reporting its location data to the base stations 204, 206, the kernel density estimator can predict that the mobile device 208 is within the mobile device communication area 202 because most of the mobile devices 210, 212, 214 are in that area.

In another embodiment at time T3, the network can use previously stored location data of the mobile device 208 in conjunction with a kernel density estimation to make a prediction. For example, most of the mobile devices 212, 214, not including the mobile device 208, are communicating with the base station 206 and therefore within the mobile device communication area 202, so the kernel density estimator can be used to predict that the mobile device 208 can be within the mobile device communication area 202. However, based on previously stored location date relative to the mobile device's 208 previous location(s), the network can predict that the mobile device 208 is in the mobile device communication area 200. The network can also assign a priority to the use of previously stored location data relative to the mobile device 208, aggregated location data relative to the other mobile devices 210 212 214, and kernel density estimations.

In another embodiment, at time T4, since the location data of the mobile device 208 is not readily available because the mobile device 208 is not providing position data to the base station 204, the kernel density estimator can be used to predict a location of the device 208 based on the stored data from times T1, T2, and T3. Thus, at time T4, a prediction can be made that the mobile device 208 is within the mobile device communication area 200 based on a kernel density estimation being applied to previously stored time and location data points.

Figure 3:
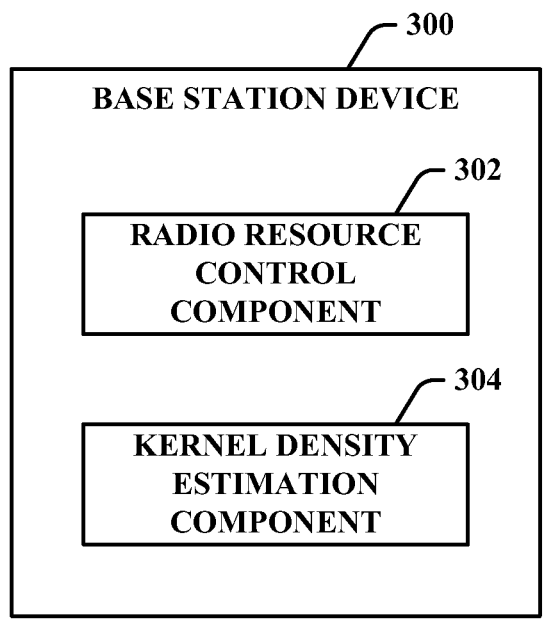
FIG. 3 illustrates an example base station device of a wireless network according to one or more embodiments.

Referring now to FIG. 3, illustrated is an example base station device of a wireless network according to one or more embodiments. The base station device 300 can comprise a radio resource control component 302 and a kernel density estimation component 304. The radio resource control component 302 can facilitate access to a resource (voice call, video call, upload/download, etc.) for a mobile device. The base station device 300 can also apply a kernel density estimator function, via a kernel density estimation component 304, to mobile device location data based on the request or the push of a resource. Once a kernel density estimation is applied to mobile device location data, the base station device 300 can facilitate selection of a resource based on a prediction related to the kernel density estimation.

Figure 4:
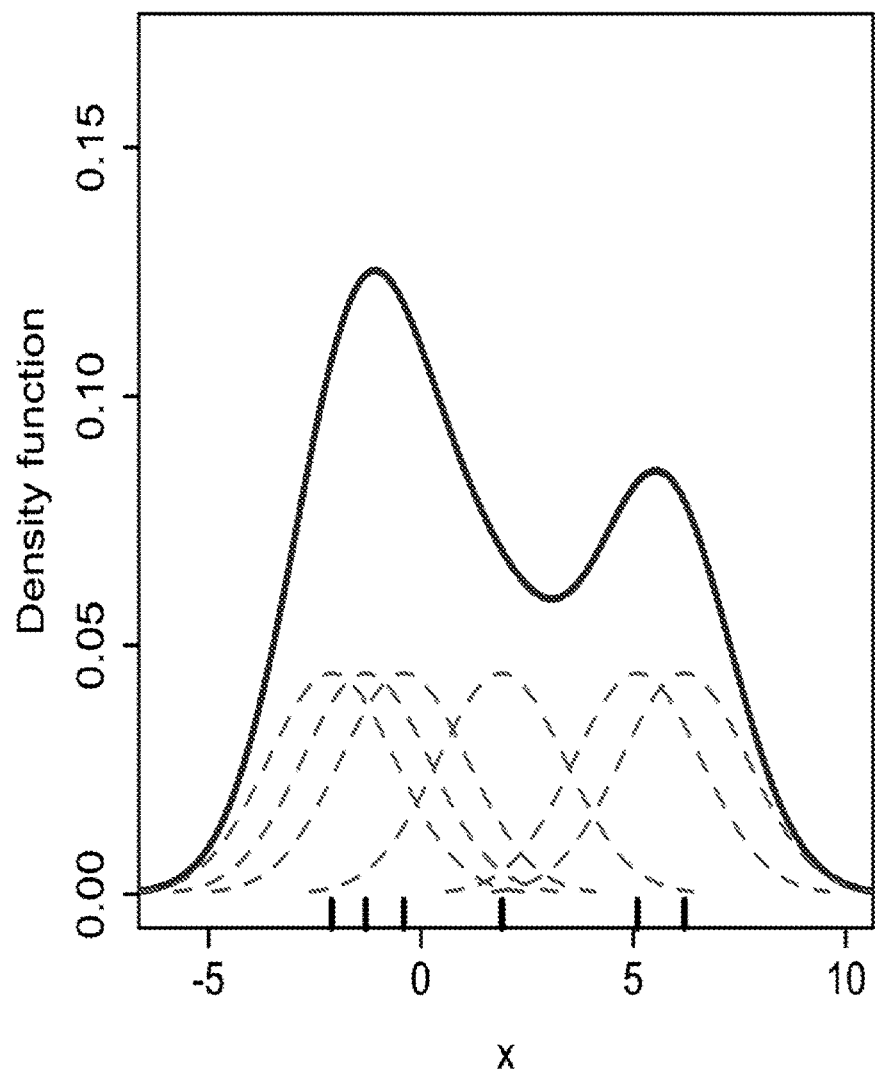
FIG. 4 illustrates an example kernel density estimation graph according to one or more embodiments.

Referring now to FIG. 4, illustrated is an example kernel density estimation graph according to one or more embodiments. Six individual kernels can be represented by the dashed lines and the kernel density estimate can be represented by the solid line. Based on the graph, on the horizontal axis, it can be seen that there are three individual kerns to the left of "0", one individual kernel to the right of "0", and two individual kernels to the right of "5". Therefore, the kernel density estimate can reflect the highest kernel density to the left of "0", the lowest kernel density to the right of "0", and the medium kernel density to the right of "5".

Figure 5:
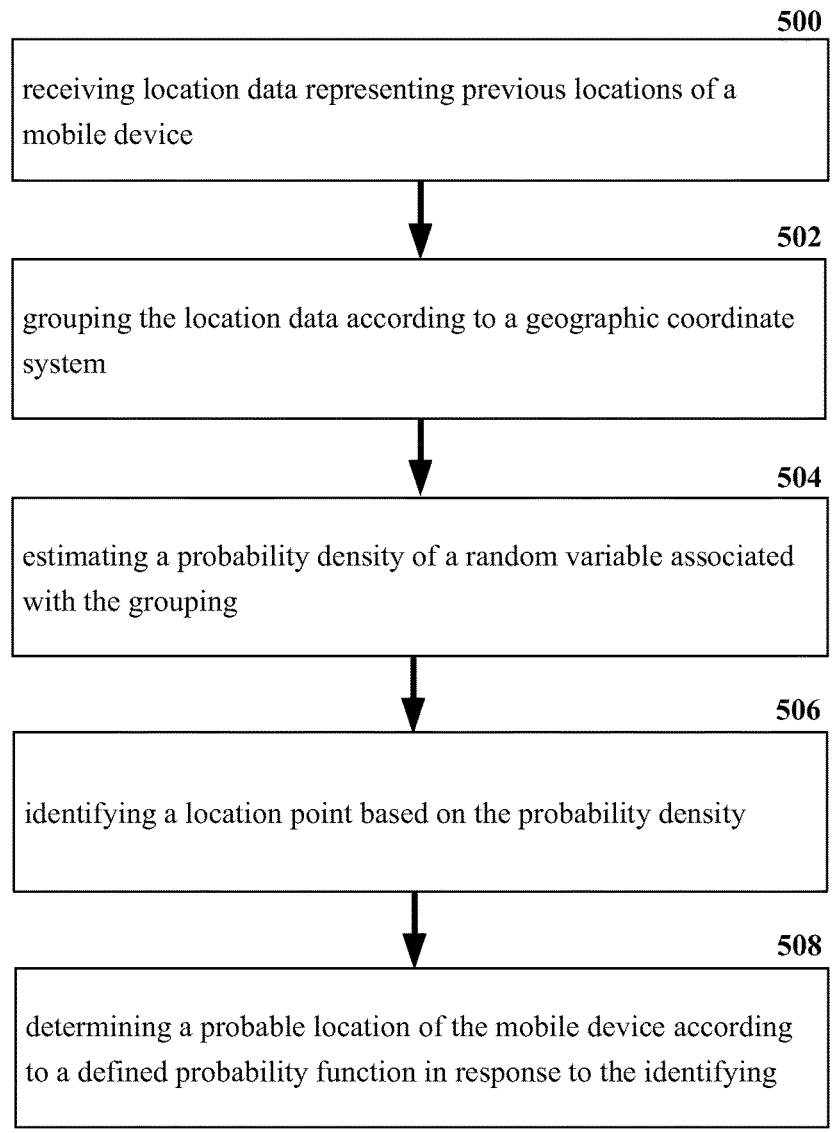
FIG. 5 illustrates an example schematic system block diagram of a wireless network determining a probable location of a mobile device according to one or more embodiments.

Referring now to FIG. 5, illustrated is an example schematic system block diagram of a wireless network determining a probable location of a mobile device according to one or more embodiments. At element 500, location data representing previous locations of a mobile device can be received. At element 502, the location data can be grouped according to a geographic coordinate system. Therefore, the collected location data can be binned to the closest geographic coordinate system, wherein the data can be pre-processed to reduce the effects of minor observation errors. The original data values, can be replaced by a value representative of an interval of the original data values. Estimating a probability density of a random variable associated with the grouping can be performed at element 504. The probability density can be estimated by utilizing a kernel density estimator to determine the most likely point in the coverage area based on the observed location data. Once the most likely points have been determined at element 504, a location point can be identified based on the probability density at element 506, and a probable location of the mobile device can be determined at element 508 according to a defined probability function in response to the location point being identified.

Figure 6:
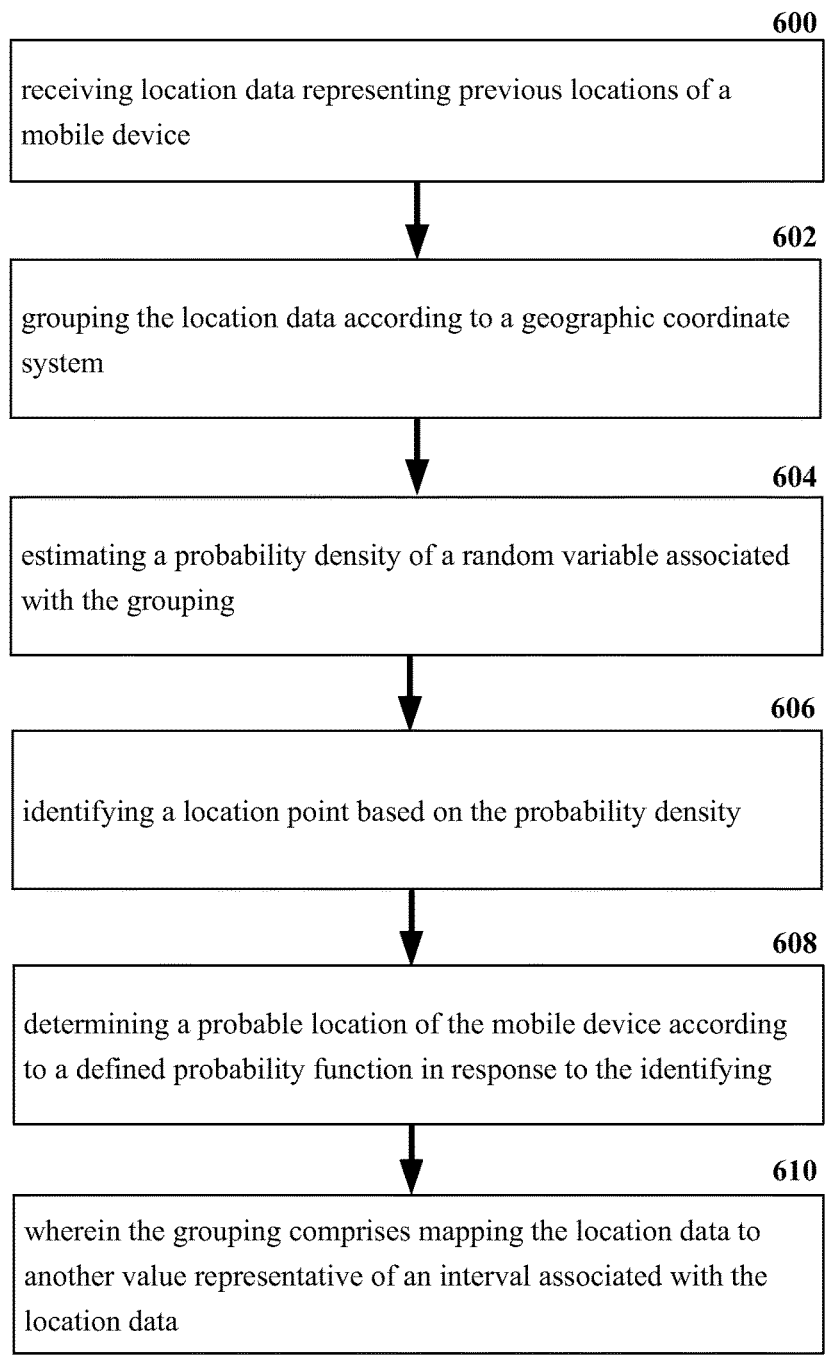
FIG. 6 illustrates an example schematic system block diagram of a wireless network determining a probable location of a mobile device comprising mapping location data to another value representative of an interval according to one or more embodiments.

Referring now to FIG. 6, illustrated is an example schematic system block diagram of a wireless network determining a probable location of a mobile device comprising mapping location data to another value representative of an interval according to one or more embodiments. At element 600, location data representing previous locations of a mobile device can be received. At element 602, the location data can be grouped according to a geographic coordinate system. Therefore, the collected location data can be binned to the closest geographic coordinate system, wherein the data can be pre-processed to reduce the effects of minor observation errors. The original data values, can be replaced by a value representative of an interval of the original data values. Estimating a probability density of a random variable associated with the grouping can be performed at element 604. The probability density can be estimated by utilizing a kernel density estimator to determine the most likely point in the coverage area based on the observed location data. Once the most likely points have been determined at element 604, a location point can be identified based on the probability density at element 606, and a probable location of the mobile device can be determined at element 608 according to a defined probability function in response to the location point being identified. At element 610, the grouping can comprise mapping the location data to another value representative of an interval associated with the location data.

Figure 7:
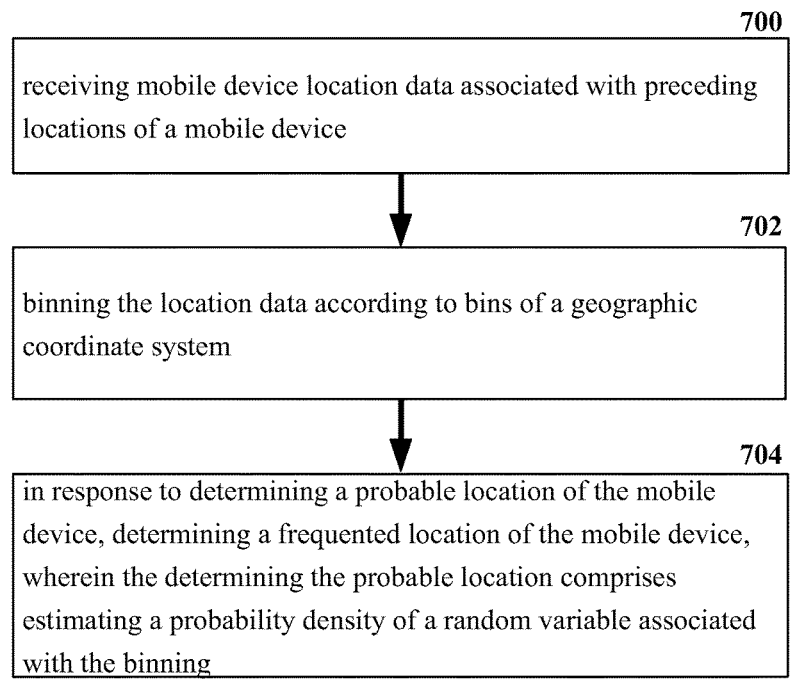
FIG. 7 illustrates an example schematic system block diagram for determining a frequented location of the mobile device according to one or more embodiments.

Referring now to FIG. 7, illustrated is an example schematic system block diagram for determining a frequented location of the mobile device according to one or more embodiments. At element 700, mobile device location data can be received associated with preceding locations of a mobile device. The location data can be binned according to bins of a geographic coordinate system at element 702. The mobile device location data can be binned to the closest geographic coordinate system, wherein the data can be pre-processed to reduce the effects of minor observation errors. The original data values, can be replaced by a value representative of an interval of the original data values. The geographic coordinate system, used for binning, can be a military grid reference system. In response to determining a probable location of the mobile device, determining a frequented location of the mobile device, wherein the determining the probable location comprises estimating a probability density of a random variable associated with the binning at element 704.

Figure 8:
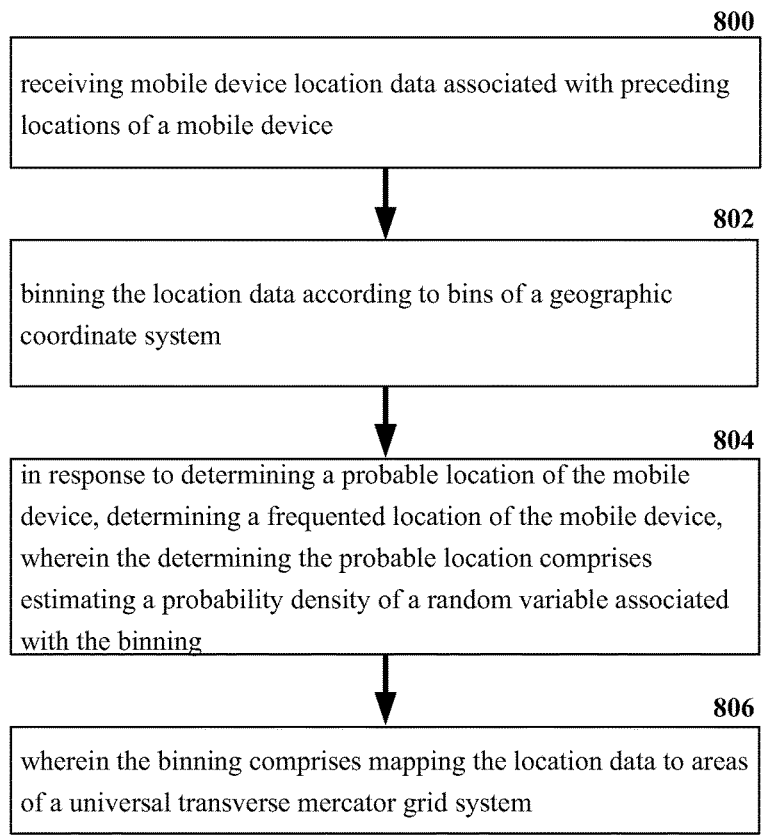
FIG. 8 illustrates an example schematic system block diagram for determining a frequented location of the mobile device comprising mapping location data to areas of a universal transverse mercator grid system according to one or more embodiments.

Referring now to FIG. 8, illustrated is an example schematic system block diagram for determining a frequented location of the mobile device comprising mapping location data to areas of a universal transverse mercator grid system according to one or more embodiments. At element 800, mobile device location data can be received associated with preceding locations of a mobile device. The location data can be binned according to bins of a geographic coordinate system at element 802. The mobile device location data can be binned to the closest geographic coordinate system, wherein the data can be pre-processed to reduce the effects of minor observation errors. The original data values, can be replaced by a value representative of an interval of the original data values. The geographic coordinate system, used for binning, can be a military grid reference system. In response to determining a probable location of the mobile device, determining a frequented location of the mobile device, wherein the determining the probable location comprises estimating a probability density of a random variable associated with the binning at element 804. At element 806, the binning can comprise mapping the location data to areas of a universal transverse Mercator grid system.

Figure 9:
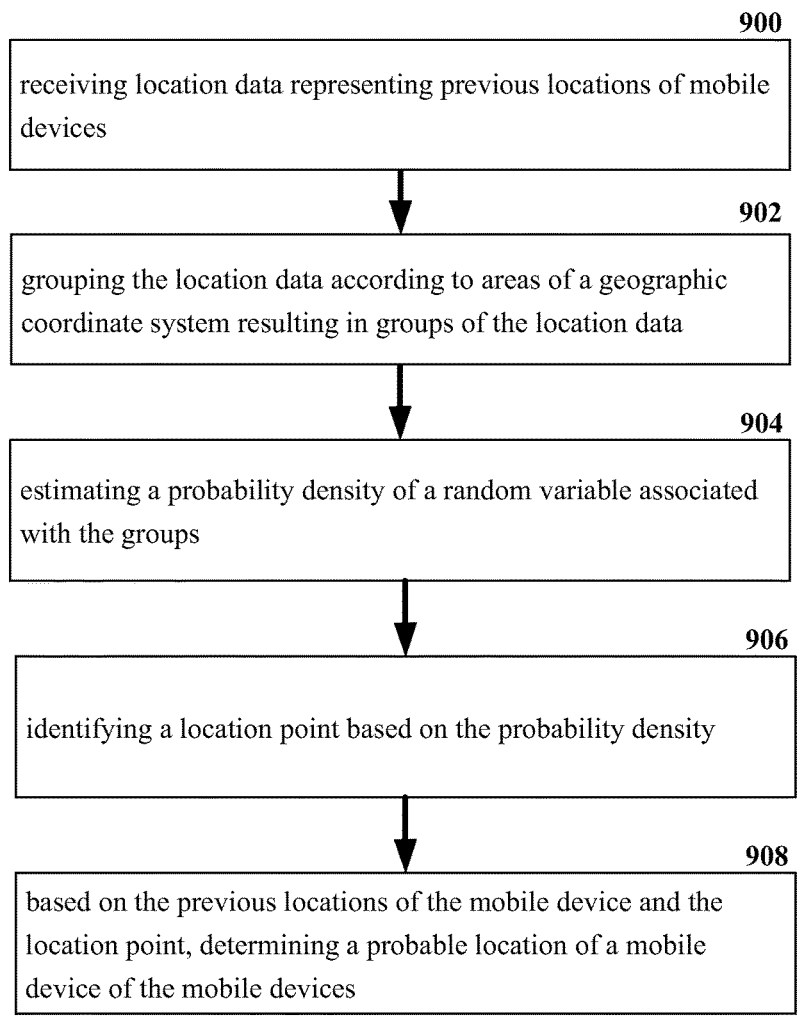
FIG. 9 illustrates an example schematic system block diagram determining a probable location of a mobile device according to one or more embodiments.

Referring now to FIG. 9, illustrated is an example schematic system block diagram determining a probable location of a mobile device according to one or more embodiments. At element 900, location data representing previous locations of mobile devices can be received. At element 902, the location data can be grouped according to areas of a geographic coordinate system resulting in groups of the location data. The mobile device location data can be grouped or binned to the closest geographic coordinate system, wherein the data can be pre-processed to reduce the effects of minor observation errors. The original data values, can be replaced by a value representative of an interval of the original data values. A probability density of a random variable associated with the groups can be estimated at element 904 and a location point can be identified based on the probability function at element 906. Consequently, based on the previous locations of the mobile device and the location point, a probable location of a mobile device of the mobile device can be determined at element 908.

Figure 10:
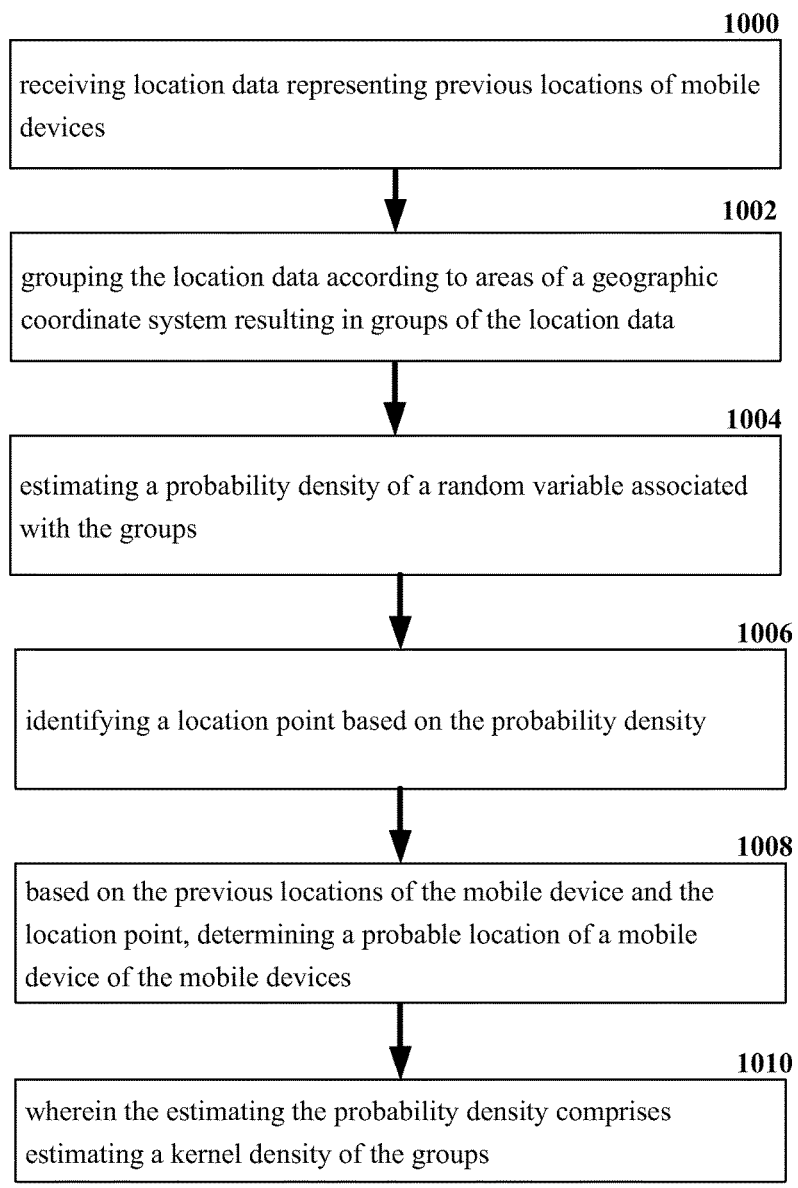
FIG. 10 illustrates an example schematic system block diagram determining a probable location of a mobile device comprising estimating a kernel density according to one or more embodiments.

Referring now to FIG. 10, illustrated is an example schematic system block diagram determining a probable location of a mobile device comprising estimating a kernel density according to one or more embodiments. At element 1000, location data representing previous locations of mobile devices can be received. At element 1002, the location data can be grouped according to areas of a geographic coordinate system resulting in groups of the location data. The mobile device location data can be grouped or binned to the closest geographic coordinate system, wherein the data can be pre-processed to reduce the effects of minor observation errors. The original data values, can be replaced by a value representative of an interval of the original data values. A probability density of a random variable associated with the groups can be estimated at element 1004 and a location point can be identified based on the probability function at element 1006. Consequently, based on the previous locations of the mobile device and the location point, a probable location of a mobile device of the mobile device can be determined at element 1008. At element 1010, the estimating the probability density can comprise estimating a kernel density of the groups. Thus, a kernel density estimation can be used to provide continuous estimates of the most frequented locations in the coverage area.

Figure 11:
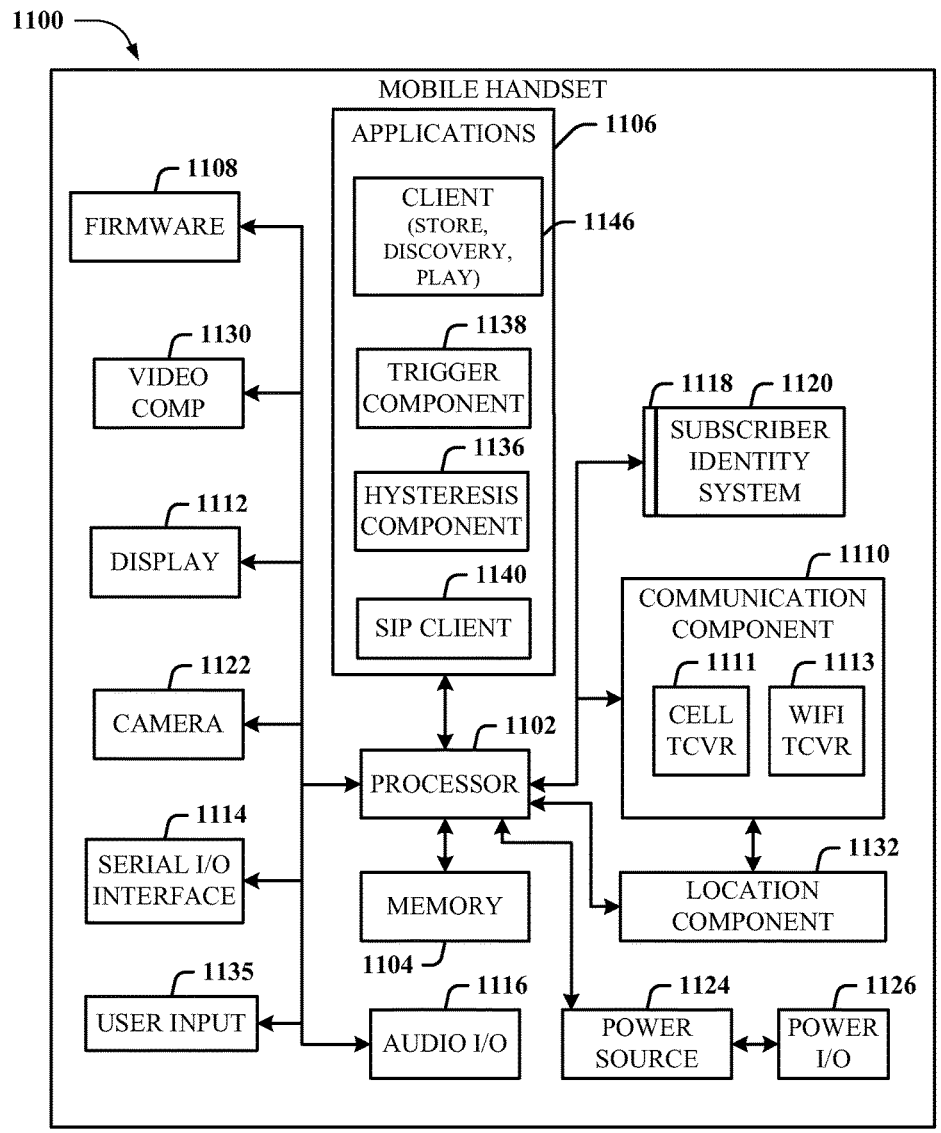
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
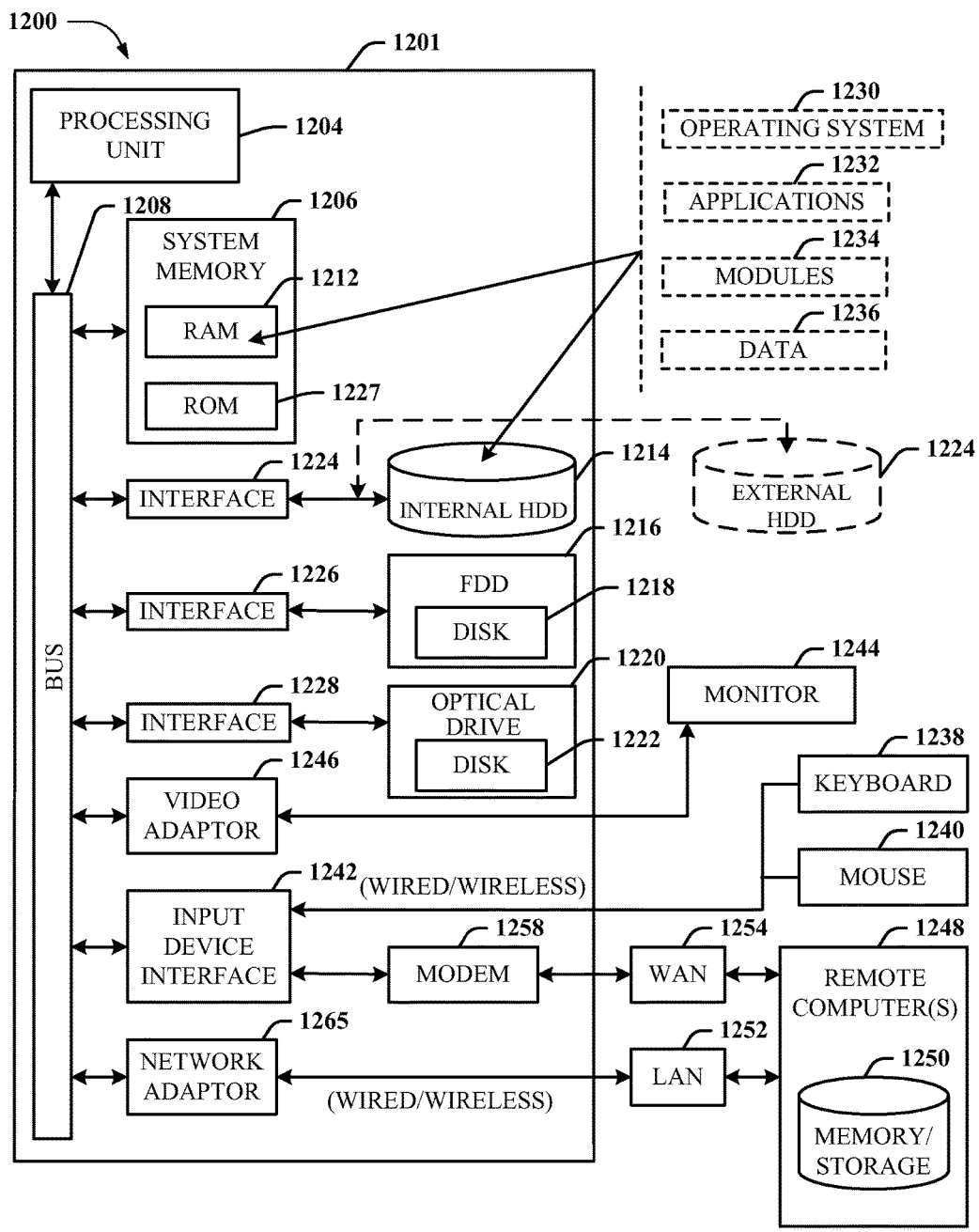
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by a wireless network device of a wireless network comprising a processor, location data representing previous locations of a mobile device of mobile devices;
grouping, by the wireless network device, the location data according to a geographic coordinate system;
estimating, by the wireless network device, a probability density of a random variable associated with the grouping, resulting in an estimated number of the mobile devices;
based on the estimated number of mobile devices exceeding a defined number of the mobile devices associated with a network capacity of a transceiver of the wireless network, generating an indication that additional network capacity beyond the network capacity is needed;
identifying, by the wireless network device, a location point based on the probability density; and
based on the location point and the indication, determining, by the wireless network device, a probable location of the mobile device according to a defined probability function.

2. The method of claim 1, wherein the grouping comprises mapping the location data to another value representative of an interval associated with the location data.

3. The method of claim 2, wherein the grouping comprises mapping the location data to a military grid reference system.

4. The method of claim 1, wherein the estimating comprises a kernel density estimation.

5. The method of claim 1, further comprising:
storing, by the wireless network device, the location point within an indexed data structure.

6. The method of claim 5, wherein the indexed data structure is indexed by a sector identifier relating to a sector of the wireless network.

7. The method of claim 5, further comprising:
updating, by the wireless network device, the data structure at a defined interval based on historical location data.

8. The method of claim 5, further comprising:
updating, by the wireless network device, the data structure at a defined interval based on the location data.

9. The method of claim 1, wherein the estimating comprises estimating the probability density of the random variable associated with the grouping according to defined time intervals.

10. A system, comprising:
a processor; and
a memory that stores executable instructions that, when executed by the processor, facilitate performance of operations, comprising:
receiving mobile device location data associated with preceding locations of a mobile device of mobile devices;
binning the location data according to bins of a geographic coordinate system wherein the binning results in an estimated number of the mobile devices;
based on the estimated number of the mobile devices and in response to a condition associated with a network capacity of a transceiver device being determined to have been satisfied, generating a request for additional network capacity over the network capacity; and
in response to determining a probable location of the mobile device and the generating the request, determining a frequented location of the mobile device, wherein the determining the probable location comprises estimating a probability density of a random variable associated with the binning.

11. The system of claim 10, wherein the binning comprises mapping the location data to areas of a universal transverse mercator grid system.

12. The system of claim 10, wherein the binning comprises mapping the location data to areas of a universal polar stereographic grid system.

13. The system of claim 10, wherein the estimating comprises a kernel density estimation.

14. The system of claim 13, wherein the kernel density estimation comprises a determination based on a Gaussian function.

15. The system of claim 10, wherein the operations further comprise:
storing the frequented location within an indexed data structure.

16. The system of claim 15, wherein the operations further comprise:
updating the indexed data structure according to a daily interval based on historical location data.

17. A non-transitory machine-readable storage medium, comprising executable instructions that, when executed by a processor, facilitate performance of operations, comprising:
receiving location data representing previous locations of mobile devices of a wireless network;
grouping the location data according to areas of a geographic coordinate system resulting in groups of the location data;

estimating a probability density of a random variable associated with the groups, resulting in an estimated number of the mobile devices;

in response to a determination that the estimated number of the mobile devices exceeds a network capacity of a transceiver of the wireless network, generating an indication that additional network capacity for the wireless network is to be requested;

identifying a location point based on the probability density; and based on the previous locations of the mobile devices and the location point, determining a probable location of a mobile device of the mobile devices.

18. The non-transitory machine-readable storage medium of claim 17, wherein the estimating the probability density comprises estimating a kernel density of the groups.

19. The non-transitory machine-readable storage medium of claim 18, wherein the estimating the kernel density comprises estimating a triangular kernel density of the groups.

20. The non-transitory machine-readable storage medium of claim 19, wherein the estimating the triangular kernel density is performed at a defined time interval.

* * * * *